May 29, 1956  C. F. BOWERSETT  2,747,454
BOLT WITH FRANGIBLE, EJECTABLE TENSION INDICATING MEANS
Filed Jan. 18, 1952

INVENTOR
C. F. BOWERSETT
BY
ATTORNEYS

United States Patent Office 2,747,454
Patented May 29, 1956

2,747,454

BOLT WITH FRANGIBLE, EJECTABLE TENSION INDICATING MEANS

Charles F. Bowersett, Laurel, Md.

Application January 18, 1952, Serial No. 267,183

5 Claims. (Cl. 85—62)

(Granted under Title 35, U. S. Code (1952), sec. 266)

The present invention relates to apparatus for indicating the amount of stress on bolts during the tightening thereof. More particularly the invention relates to apparatus for indicating the stress on bolts by providing a headed stress rod of brittle material mounted in a bore in the bolt and which will fracture as the bolt is elongated beyond a predetermined value by tightening.

Prior art devices employ the principle of measuring the amount of torque required to tighten a bolt. Such devices are not entirely successful in that differences in the fit of threads, burrs on the faces of abutting parts and other causes affect the reading of the torque measuring device and thus such devices do not give an accurate measurement of tightness, stress or tension on the bolt itself. In other devices which measure elongation of bolts, expensive measuring instruments are employed which are difficult to maintain in accurate condition and it is difficult or impossible to use such devices in places where space is at a premium.

The device of the present invention as aforesaid is for the purpose of indicating a desired tension or stress on a bolt, cap screw, or stud by the breaking of an element made of a suitable plastic or other low elasticity material, the element in breaking at a weakened portion thereof is propelled outwardly of the bore in the bolt. The breaking point of the material of which the element is made being known, the stress along the length of the bolt may be accurately measured.

An object of the present invention is to provide apparatus for measuring the stress on a bolt, screw or stud and which is automatic in operation.

A further object is to provide a bolt or other threaded securing apparatus having a self-contained stress indicating device and which is low in cost.

A still further object is to provide a new and improved apparatus for indicating a desired amount of elongation on a threaded securing device in a simple and efficacious manner.

Other objects and many of the attendant advantages of this invention will be readily appreciated as the same becomes better understood by reference to the following detailed description when considered in connection with the accompanying drawings wherein.

Figure 1:
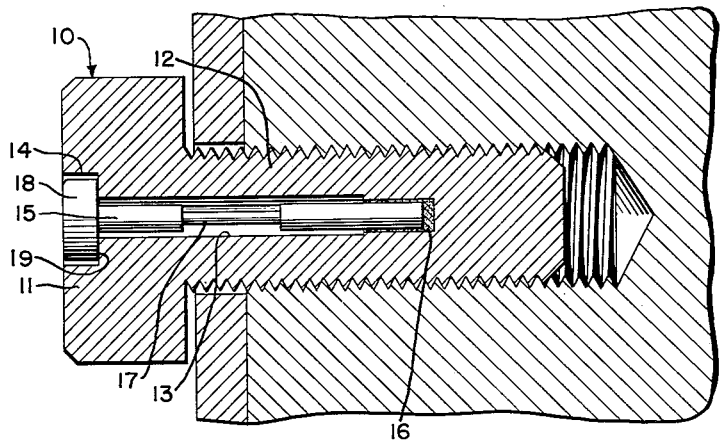
Fig. 1 is a sectional view of a bolt in accordance with the present invention.

Referring more particularly to the drawing wherein like numerals indicate like parts throughout the several views, 10 indicates generally a bolt, it being understood that the present invention may be used with equal facility with studs or other forms of screw-threaded securing devices. Bolt 10 is provided with a head 11 and a screw-threaded shank 12, an axial bore 13 extending part way through shank 12 and an enlarged portion 14 of bore 13 at the open end thereof.

Figure 2:
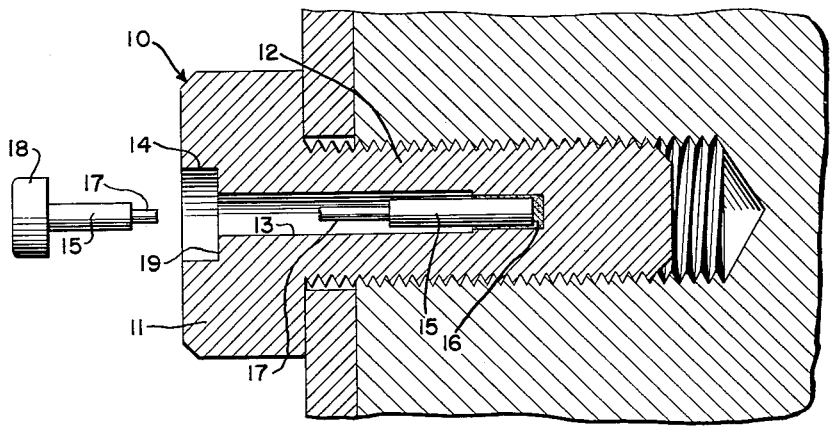
Fig. 2 is a sectional view similar to Fig. 1 and showing the bolt under a desired tension.
Figure 3:
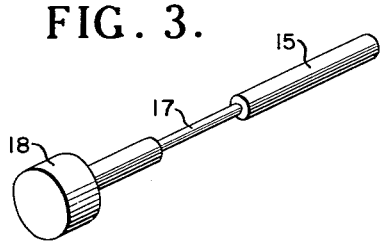
Fig. 3 is a perspective view of the plastic insert.

A brittle frangible element 15 is cemented as at 16 in bore 13 at the closed end thereof and has a weakened portion 17 of uniform reduced cross sectional area extending throughout a fractional portion of the length thereof, Figs. 1–3 and an enlargement or head 18 formed integrally therewith. The enlarged portion 14 of bore 13 forms a shoulder 19 against which the head 18 rests.

As illustrated in Fig. 1 of the drawing, the bolt 10 has not been tightened, therefore there is no tension between shank 12 and head 11, while Fig. 2 illustrates the bolt tightened and the frangible element 15 broken at the weakened portion 17 thereof it being understood that the bolt is elongated by tightening thus breaking element 15, the breaking point of element 15 being governed by the elastic limit of the material employed therein and the size of the weakened portion. It is clear that as the bolt is elongated shoulder 19 bears more forcibly against head 18 of element 15 thus stretching the weakened portion 17 beyond the elastic limit thereof and causing the headed portion 18 to be severed from the secured portion of the element and be suddenly and forcibly ejected from the bolt 10, Fig. 2, as a visual signal to the operator that the bolt has been properly and sufficiently tightened.

It is, also, clear that a high degree of accuracy in indicating the strain or tension on a bolt may be provided in an economical manner by the device of the present invention, the element 15 being adapted to molding thus eliminating machining and ensuring accuracy when made in large quantities. The device is assembled easily without complicated procedures involving a high degree of accuracy, it being only necessary to press the element 15 into bore 13 during the cementing operation until head 18 rests on seat 19.

By providing a frangible indicating element composed of brittle material in which two rigid elongated portions or sections are interconnected by a weakened portion or section of uniform decreased cross sectional area and the end portions of the elongated sections are secured to the end portions respectively of the axial bore of a bolt, the elongation of that portion of the bolt between the points of connection with the indicating element as the bolt is tightened is of the same order of magnitude as the elongation of the weakened section. Furthermore, since the length of the weakened section is but a fractional portion of the length of the bolt, the strain applied to the weakened section is greater than the strain applied to the bolt. A strain amplifying arrangement is thus provided in which the degree of strain in the weakened section is proportional to the ratio of that portion of the length of the bolt between the points of connection with the indicating element with respect to the length of the weakened section. From the foregoing it will be understood that the indicator operates on the principle of a strain multiplier in which the ratio of strain multiplication may be controlled by the length of the weaken section, it being merely necessary that the weakened section is composed of brittle material suitable for the purpose such, for example, as the plastic insert or indicator 15, Fig. 3, disclosed herein.

Figure 4:
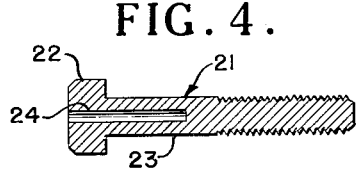
Fig. 4 is a reduced sectional view of a slightly modified bolt for use with a depth gage or the device of Fig. 3.

As shown in the modification of Fig. 4 a bolt 21, having a head 22 and a threaded shank 23, is provided with an axial bore 24 extending part way therethrough. It is apparent that a depth gage (not shown) may be inserted to the bottom of bore 24 before the bolt is tightened in use to secure a measurement of the distance from the bottom to the outer face of head 22 or, if desired, the device of Fig. 3 may be employed therewith. The bolt is tightened until a desired amount of elongation of the bolt, as measured by the depth gage has occurred which will give a substantially accurate indication of the tightness thereof.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed and desired to be protected by Letters Patent of the United States is:

1. A bolt having means for indicating a predetermined elongation resulting from the tightening thereof comprising, in combination, an elongated threaded member having a head at one end thereof and an axial bore extending part way therethrough, said bore being reduced at the closed end thereof and enlarged at the open end thereof to provide a shoulder within said bore, a rod composed of brittle material and having a pair of mutually spaced cylindrical elements, one of said elements being disposed within and secured to said bolt at the reduced end of said bore, means disposed within the reduced end of said bore in engagement with said one cylindrical element and the bolt for securing the rod to the bolt, a weakened portion of reduced cross sectional area integrally formed with said cylindrical elements and disposed therebetween, an indicating head integrally formed with the other cylindrical element and set in the enlarged end of the bore normally engaging said shoulder whereby the weakened portion of the rod will be broken and said indicating head will be forcibly ejected from said elongated bore in response to the sudden release of stress forces within the rod when said threaded member is elongated by tightening the bolt sufficiently to effect said predetermined elongation.

2. A bolt capable of elongation to a precise and predetermined value, comprising a body member having an axial bore extending from the head thereof to a dead end of said bore within the member, an indicator composed of brittle material and arranged within said bore comprising a pair of mutually spaced elongated cylindrical portions of less diameter than said bore, an indicating head formed integrally with one of said cylindrical portions and having a shoulder normal to the axis of said cylindrical portions, said shoulder normally engaging the head of the bolt, a weakened section of less cross sectional area than said cylindrical portions integrally formed with said cylindrical portions and disposed therebetween such that said weakened section is fractured and the indicating head is detached in response to a predetermined elongation of the weakened section, and means connecting the other one of said cylindrical portions to the bolt at the dead end of the bore, said indicating head being detached and forcibly ejected from the bolt as said weakened section is broken in response to a predetermined elongation thereof corresponding to the elongation of the bolt as the bolt is tightened.

3. A bolt according to claim 2 and including a second bore in said body member of greater diameter than said indicating head and coaxial with said axial bore whereby the indicating head normally engages the bottom of said second bore.

4. A bolt according to claim 3 in which said second bore is of a depth corresponding substantially to the depth of said indicating head.

5. A bolt according to claim 2 in which the indicator is composed of brittle plastic material.

References Cited in the file of this patent

UNITED STATES PATENTS

| | | |
|---|---|---|
| 1,532,736 | Dodds | Apr. 7, 1925 |
| 2,413,797 | Stone | Jan. 7, 1947 |
| 2,503,141 | Stone | Apr. 4, 1950 |
| 2,571,718 | Howes | Oct. 16, 1951 |
| 2,600,029 | Stone | June 10, 1952 |